United States Patent [19]
Rhodes

[11] 3,809,363
[45] May 7, 1974

[54] GATE VALVE STEM THRUST COLLAR LUBRICATION
[75] Inventor: Robert L. Rhodes, Hixon, Tenn.
[73] Assignee: Mueller Co., Decatur, Ill.
[22] Filed: Apr. 3, 1973
[21] Appl. No.: 347,363

[52] U.S. Cl.............................. 251/355, 251/266
[51] Int. Cl............................................ F16k 41/02
[58] Field of Search ........... 251/355, 266; 137/298, 137/330, 331

[56] References Cited
UNITED STATES PATENTS
| | | | |
|---|---|---|---|
| 3,428,297 | 2/1969 | Volpin | 251/355 |
| 3,398,964 | 8/1968 | Trefil | 251/355 |
| 2,757,897 | 8/1956 | Cline | 251/355 X |
| 2,587,934 | 3/1952 | Volpin | 251/266 X |

Primary Examiner—Alan Cohan
Assistant Examiner—Ira S. Lazarus
Attorney, Agent, or Firm—Cushman, Darby & Cushman

[57] ABSTRACT

A non-rising stem type of valve assembly utilizing a closed lubricant chamber or reservoir for the thrust collar on the valve stem. Means are provided for replenishing the lubricant to the bearing surfaces of the thrust collar and the reservoir during each operation of the valve, the means including pumping or forcing lubricant between the bearing surfaces of the thrust collar and of the closed lubricant reservoir in either direction depending on rotation of the valve stem. The lubricant may either be forced as a film between the surfaces of the collar and the lubricant reservoir which are about to mate or are separating.

8 Claims, 4 Drawing Figures

GATE VALVE STEM THRUST COLLAR LUBRICATION

The present invention relates to an improvement in valves of the non-rising stem type. While the invention is particularly adapted for use with a gate valve, it will be understood that the benefits of the improvements disclosed herein are not limited to any type of valve but only to valves having non-rising stems with very limited axial movement relative to the bore through which they extend.

BACKGROUND OF THE INVENTION

Valve stems of the non-rising type present a difficult problem with respect to maintaining of a seal around a valve stem which is sufficiently permanent in character. In U. S. Pat. No. 2,757,897 issued Aug. 7, 1956 to Earl E. Cline and assigned to the same assignee as the present application, there is disclosed a solution to the problem of maintaining a seal around a valve stem and particularly around the thrust collar for such a non-rising stem. In this patent, the non-rising valve stem extends through a bore in the housing of the valve, the non-rising valve stem being rotatable to operate a valve member. The valve stem is provided with the usual thrust collar which is positioned in an enlargement in the bore through the housing, the enlargement defining a closed lubricant reservoir and having bearing surfaces for cooperating with the bearing surfaces on the thrust collar. An O-ring seal is carried in a groove between the valve stem and the bore both above and below the thrust collar to provide a seal for the lubricant reservoir as well as the fluid with the valve housing.

While the valve assembly described in the aforementioned U.S. Pat. No. 2,757,897 has proved quite commercially acceptable, especially in view of its particular disclosure and arrangement of O-ring seals, there did exist high overall operating torques, especially after the lubricant had dissipated between the respective bearing surfaces of the thrust collar and the enlargement defining the lubricant reservoir. When these operating torques became too high, then the cap defining one bearing surface for the enlargement had to be removed and new lubricant applied to the reservoir. In some instances in the prior art passageways led from the lubricant reservoir to the exterior of the housing where a typical lubricant fitting was provided for receiving a grease gun or the like. U.S. Pat. No. 3,398,964 issued Aug. 27, 1968 to Trefil discloses such a conventional lubricant feed means but these arrangements likewise required frequent servicing.

BRIEF SUMMARY OF THE PRESENT INVENTION

The present invention includes a valve assembly of the type disclosed in U.S. Pat. No. 2,757,897 issued Aug. 7, 1956 to Cline and the subject matter of this patent is incorporated herein by reference to the disclosure. The improvement of the present invention over the Cline patent includes providing positive means for pumping lubricant in the closed lubricant reservoir in one direction axially of the same or another direction axially of the same dependent upon rotation of the valve stem, the pumping of the lubricant insuring the provision of a film between the bearing surfaces of the thrust collar and the bearing surfaces of the lubricant reservoir. By utilizing means to pump the lubricant, so that films of lubricant are always formed between the bearing surfaces of the thrust collar and the bearing surfaces of the lubricant reservoir, the operating torques for the valve assembly are maintained at lower values over longer periods of time and for more individual actuations of the valve assembly.

To obtain the pumping action referred to above, the thrust collar is provided on its peripheral wall with a spiral groove concentric with the axis of the valve stem. The groove which is preferably in the form of a screw thread operates in almost contiguous relationship with the peripheral wall of the lubricant reservoir and thus, when the valve stem is rotated, the lubricant is transferred to either side of the thrust collar depending upon the hand of the spiral groove. Of course, the spiral groove may if desired be provided on the peripheral wall of the lubricant reservoir and the same type of action will occur when there is relative rotation between the peripheral wall of the thrust collar and the lubricant reservoir.

BRIEF DESCRIPTION OF THE DRAWINGS

Referring to FIGS. 1 and 2 wherein like character or reference numerals represent like of similar parts, there is shown a valve assembly generally designated at 10, the valve assembly being preferably a gate valve although not limited to such a valve. The valve assembly 10 includes a housing 12 forming a valve chamber 14 in which a valve member 16 such as a gate moves between open and closed position. The valve member 16, a portion of which is shown, includes the usual operating nut 18 having interior threads 20 for receiving the threads 22 of a non-rising valve stem 24.

Figure 1:
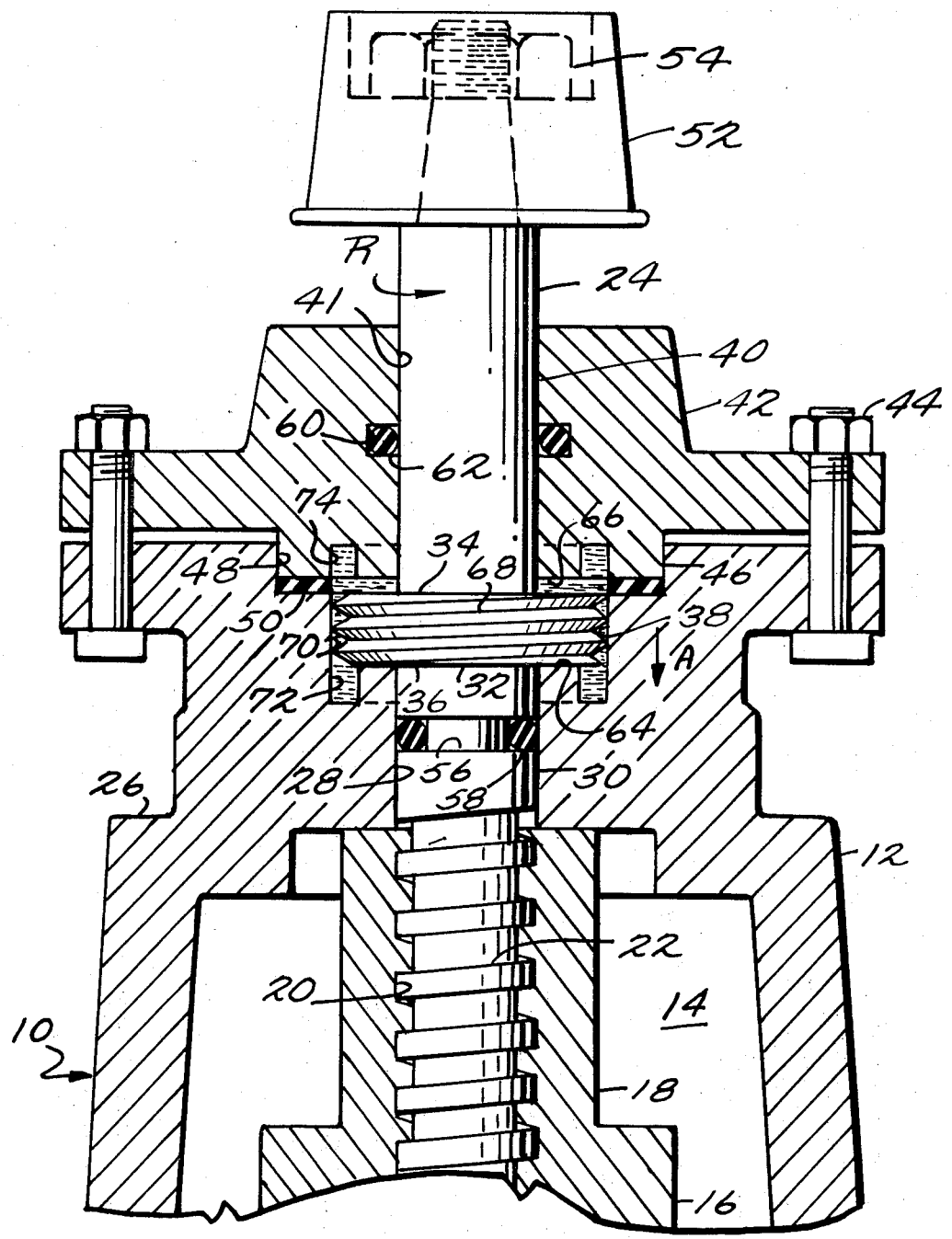
FIG. 1 is a fragmentary vertical sectional view through a valve embodying the present invention, the view illustrating the gate valve member in its fully open position with its nut and bearing against the interior of the housing.

The upper portion of the housing 10 is generally referred to as a bonnet 16 and is detachable from the lower portion of the housing by means (not shown). The bonnet 26 is provided with a bore 28 through which the valve stem 24 extends, the bore 28 serving as a bearing surface for the portion 30 of the valve stem. A thrust collar 32 is provided on the valve stem 24, the thrust collar having parallel sides 34 and 36 which are perpendicular to the axis of the valve stem and which define bearing surfaces. The thrust collar 32 is positioned within a chamber 38 defining an enlargement or lubricant reservoir around the collar.

The upper portion 40 of the valve stem extends through bore 41 in a cap 42 bolted to the bonnet 26 as indicated at 44. The bore 41 provides a bearing for the upper portion 40 of the valve stem 24. The cap 42 has an extension 46 which extends into a counterbore 48 or recess in the upper portion of the bonnet 26, and compresses an annular backing strip or gasket 50 to make a seal therewith. The valve stem 24 has the usual head 52 on its outer end, the head being held thereon by a nut 54. Head 52 is used to turn the stem 24 to open and close the valve assembly 10.

Valve stem 24, in the portion 30, is provided with an annular groove 56 spaced beneath the reservoir 38 which receives an O-ring 58, the O-ring 58 being subjected to the interior pressure of the chamber 14 to make a tight seal between bore and the stem to prevent leakage therefrom as well as to prevent leakage of lubricant from the lubricant reservoir 38. The cap 42 is provided with an annular groove 60 spaces outwardly of the reservoir which receives an O-ring 62 on the outer side of the thrust collar 32. It will now be apparent that sealing means are provided between the stem 24 and the bore 28 in the bonnet 26 and between stem 24 and the bore 41 in the cap 42 as well as by means of the gasket 50 so that the lubricant reservoir 38 is a completely closed reservoir. It can only be refilled by removal of the cap 42.

The axial thickness of the thrust collar 32 is slightly less than the axial distance between the bearing surfaces 64 and 66 of the lubricant reservoir or enlargement and thus there can be slight axial movement of the valve stem 24 when it is rotated, this being illustrated by reference to FIGS. 1 and 2 which show two different positions of the valve member 16. A spiral groove 68 is provided on the exterior of the thrust collar 32, the groove being preferably in the form of a screw thread. It will be noted that the tips of the threads of the spiral groove 68 are positioned closely adjacent the peripheral wall 70 of the lubricant reservoir 38 and consequently depending upon the direction of rotation of the valve stem 24, the lubricant is either pumped upwardly and between the bearing surfaces 34, 66 or downwardly between the bearing surface 36, 64. In order to provide more capacity to the lubricant reservoir 38 the bearing surfaces 64 and 66 which define the side walls of the reservoir 38 are provided with annular grooves 72 and 74 that are filled with the lubricant, the grooves functioning to assist in the proper lubrication as will be explained in more detail later in the specification.

The total operating torque of a non-rising stem type of valve assembly is a combination of the friction caused by the threads 22 of the valve stem 24 operating against the threads 20 of the nut 18 of the valve member 16 plus the frictional forces resulting between the mating bearing surfaces 34, 66 and/or 36, 64 the thrust collar 32 and the lubricant reservoir 38 in which the thrust collar rotates. The present invention, by providing a sealed lubricant reservoir or chamber 38 and means for forcefully moving the lubricant therein as a film between mating bearing surfaces on the thrust collar 32 and the lubricant reservoir 38 itself, effectively reduces the friction forces between these surfaces. Consequently, the total operating torque of the valve assembly 10 is reduced for a longer period of time due to the replenishing of the film of lubricant between the bearing surfaces of the reservoir and the thrust collar each time the valve is operated.

Referring now to FIG. 1, it will be noted that the valve member 16 is in the fully open position and consequently the thrust collar 32 has its lower bearing surface 36 bearing tightly against the bearing surface 64 of the lubricant reservoir 18. Of course, there is a film of lubricant between bearing surfaces as it was forced there on a previous operation of the valve assembly. To close the valve, the valve stem must be rotated in the direction of the arrow R and, when rotated in this counterclockwise direction, the threads 68 of the thrust collar also rotate in a counterclockwise direction. Since the threads 68 have the same hand as the hand of the threads 22 of the valve stem, the lubricant in the closed reservoir 38 will be pumped downwardly in the direction of the arrow A by the threads 68 and as the surfaces 36 and 64 separate, the lubricant will be again forced between these surfaces in a film so that the next time the valve is opened there will be a film provided. It will be understood that when the valve member 16 approaches the closed position, it will cause a slight axial movement of the valve stem upwardly so that the bearing surface 34 approaches and eventually contacts the bearing surface 66 with a film of lubricant being left therebetween. However, this film of lubricant between these two surfaces 34 and 66 was replenished on the previous operation of the opening of the valve.

Figure 2:
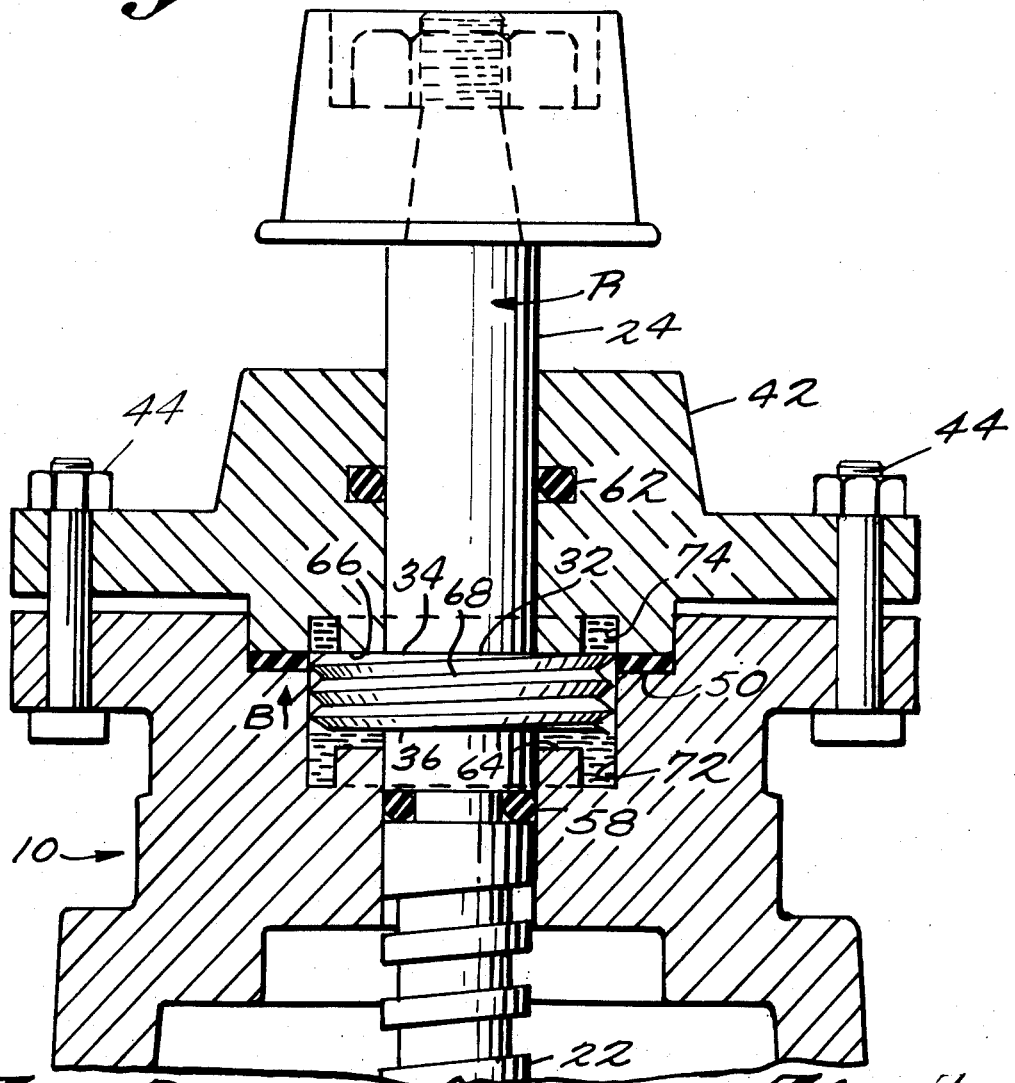
FIG. 2 is a view similar to FIG. 1 but illustrating the slight movement axially of the valve stem when the gate valve member has been moved to the closed position.

Referring now to FIG. 2, it will be noted that the valve stem 24 is shown about ready to be rotated in a clockwise direction as indicated by the arrow R and this results in the lubricant flowing upwardly in the direction of the arrow B to replenish the film between the surfaces 34 and 66 as they move away from one another. The surfaces 36 and 64 approach one another but, as just described above, a film of lubricant was forced between these surfaces as the valve was moved to the closed position.

Figure 3:
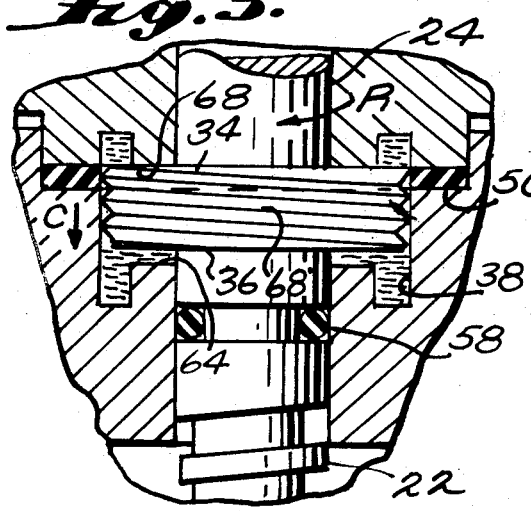
FIG. 3 is a fragmentary view of a modification of the valve assembly of FIGS. 1 and 2, the view illustrating the valve assembly when in the fully closed position.

Referring now to FIG. 3 of the drawing, there is disclosed a slight modification of the arrangement found in FIGS. 1 and 2. In FIG. 3 the threads 68' have an opposite hand from the threads 22 on the valve stem 24 and consequently there is a reverse pumping action in the sealed lubricant reservoir 38. The valve assembly in FIG. 3 is shown in a position where the valve is fully closed and assuming the valve assembly is to be opened, the valve stem 24 will be rotated clockwise in the direction of the arrow R. Since the threads 68' are of an opposite hand to those threads 22, the lubricant in the sealed lubricant reservoir 38 moves downwardly in the direction of the arrow C and forcefully between the approaching mating surfaces 36 and 64. Of course, it has been found more preferable to force the lubricant toward the non-contacting surfaces as there is no resisting force to prevent it from flowing between these surfaces when these surfaces are moving apart.

Figure 4:
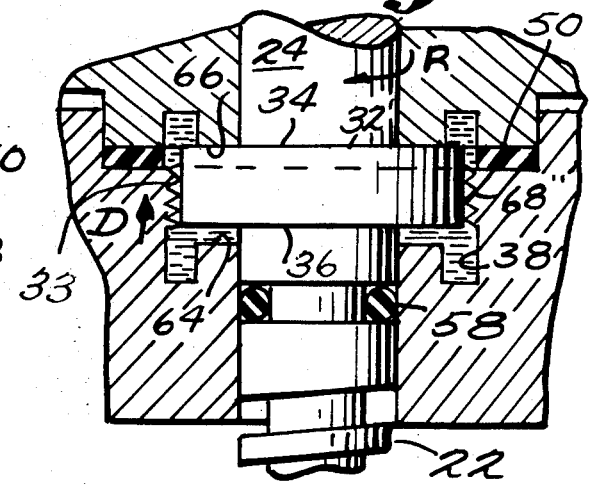
FIG. 4 is a further fragmentary view of another modification of the valve assembly, the valve stem being shown in the position when the valve is fully closed.

In FIG. 4, there is disclosed a still further modification of the valve assembly 10 of FIGS. 1 and 2. In FIG. 4 the valve stem 24 is provided with a conventional type of thrust collar 32' which has a smooth peripheral wall and the usual side walls 34 and 36 which function as bearing surfaces. In order to obtain the pumping action discussed above, the spiral groove or thread 68'' are formed in the peripheral wall of the closed lubricant reservoir 38, the thread having its tips or apexes in close proximity to the smooth peripheral wall 33 of the thrust collar 32. The valve assembly, as mentioned above, is shown in the closed position and when it is opened by clockwise rotation of the valve stem 24 in the direction of the arrow R, the thread 68'' will move the lubricant upwardly in the direction of the arrow D and will force the lubricant as a film between the surfaces 34 and 66 as they move away from one another.

The surfaces 36 and 64 will already have a film of lubricant from the previous operation of the valve assembly.

The terminology used in this specification is for the purpose of description and not limitation, the scope of the invention being defined in the claims.

What is claimed is:

1. In a valve assembly having a housing forming a valve chamber, a valve within said chamber, a rotary valve stem of the non-rising type for operating the valve member, means defining a bore through a wall of the housing to receive and form a bearing for the stem, a thrust collar on said stem where said stem passes through said bore, said thrust collar having a peripheral wall and spaced sides defining bearing surfaces, said bore having an enlargement therein to receive said thrust collar and to provide additional space therearound constituting a closed lubricant reservoir having a peripheral wall and spaced end walls defining bearing surfaces for coacting with the bearing surfaces of said thrust collar, said lubricant reservoir having an axial length slightly greater than the thickness of the thrust collar to permit limited axial movement of the stem, and sealing means between the stem and the bore and positioned on opposite sides of the reservoir and the thrust collar, the improvement comprising means between the closed lubricant reservoir and the thrust collar and operative upon rotation of the stem to cause lubricant in the reservoir to be pumped under force to one side or the other of the thrust collar depending on the direction of rotation of the stem whereby a film of lubricant is maintained between the bearing surfaces of the thrust collar and the bearing surfaces of the lubricant reservoir to reduce operating torques.

2. A valve assembly as claimed in claim 1 in which said means is a spiral groove on at least one of the peripheral walls of said thrust collar and said lubricant reservoir.

3. A valve assembly as claimed in claim 2 in which said spiral groove is on the peripheral wall of said thrust collar.

4. A valve assembly as claimed in claim 3 in which said valve stem has a thread of a predetermined hand for operating the valve member, and said spiral groove on said peripheral wall of said thrust collar is of the same hand whereby lubricant is pumped toward the bearing surface of the lubricant reservoir and the bearing surface of the thrust collar leaving contact with one another.

5. A valve assembly as claimed in claim 3 in which said valve stem has a thread of a predetermined hand for operating the valve member and said spiral groove on said peripheral wall of said thrust collar is of an opposite hand whereby lubricant is pumped toward the bearing surface of the lubricant reservoir and the bearing surface of the thrust collar approaching contact with one another.

6. A valve assembly as claimed in claim 2 in which each of said bearing surfaces of said lubricant reservoir is provided with an annular groove to increase the lubricant capacity of the reservoir.

7. A valve assembly as claimed in claim 2 in which said spiral groove is on the peripheral wall of the lubricant reservoir.

8. A valve assembly as claimed in claim 2 in which said spiral groove is in a form of a screw thread.

* * * * *

UNITED STATES PATENT OFFICE
CERTIFICATE OF CORRECTION

Patent No. 3,809,363            Dated May 7, 1974

Inventor(s) Robert L. Rhodes

It is certified that error appears in the above-identified patent and that said Letters Patent are hereby corrected as shown below:

<u>In the Abstract:</u>

Third line from the bottom, the word "either" should be deleted.

<u>In the Specification:</u>

Column 2, line 40, delete "of" and insert --or--

Column 3, line 10, the word --the-- should follow the word "between"

Column 3, line 13, the word "spaces" should read --spaced--

Column 3, line 50, a --,-- should appear after the numeral "64"

Column 3, line 67, the numeral "18" should be the numeral --38--

Column 4, line 58, the word "are" should be --is--

Signed and Sealed this twenty-fourth Day of February 1976

[SEAL]

Attest:

RUTH C. MASON           C. MARSHALL DANN
*Attesting Officer*         *Commissioner of Patents and Trademarks*